United States Patent
Noldus

(10) Patent No.: US 9,112,962 B2
(45) Date of Patent: Aug. 18, 2015

(54) METHOD AND APPARATUS FOR ACQUIRING AN IMEI ASSOCIATED TO AN IMSI

(75) Inventor: Rogier August Caspar Joseph Noldus, Goirle (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 69 days.

(21) Appl. No.: 13/130,012

(22) PCT Filed: Nov. 24, 2008

(86) PCT No.: PCT/EP2008/066095
§ 371 (c)(1),
(2), (4) Date: May 18, 2011

(87) PCT Pub. No.: WO2010/057539
PCT Pub. Date: May 27, 2010

(65) Prior Publication Data
US 2011/0223898 A1    Sep. 15, 2011

(51) Int. Cl.
*H04M 1/57* (2006.01)
*H04L 12/16* (2006.01)
*H04L 12/66* (2006.01)
(Continued)

(52) U.S. Cl.
CPC ......... *H04M 3/2281* (2013.01); *H04L 63/1416* (2013.01); *H04L 63/30* (2013.01); *H04W 12/12* (2013.01)

(58) Field of Classification Search
CPC ........ H04W 12/02; H04W 4/22; H04W 64/00
USPC .............. 455/415; 370/261, 352; 379/210.01; 709/204
See application file for complete search history.

(56) References Cited

U.S. PATENT DOCUMENTS 6,349,206 B1   2/2002  Reichelt et al.
6,826,403 B1 * 11/2004  Minborg et al. ............ 455/445
(Continued)

FOREIGN PATENT DOCUMENTS

CN   1913679 A    2/2007
CN   101009880 A  8/2007
(Continued)

OTHER PUBLICATIONS

3GPP TS 23.003 V8.2.0; 3rd Generation Partnership Project; Technical Specification Group Core Network and Terminals; Numbering, addressing and identification (Release 8); Sep. 2008.
(Continued)

*Primary Examiner* — Mahendra Patel
*Assistant Examiner* — Natasha Cosme

(57) ABSTRACT

A method comprises the steps of establishing a call between a first user equipment and a second user equipment, acquiring the identity of the second user equipment, and providing the identity of the second user equipment to the first user equipment. The invention has the advantage that it enables a law enforcement agent (for example a police officer or investigator) to track the equipment that is used by a person for a particular call. When a suspect call is received, a law enforcement agent can easily return a call to that phone, even when the SIM card of that phone is swapped. When placing a call to a suspect number, the law enforcement officer can easily determine on which device the call is answered and then determine which other persons (MSISDNs) have been using that device.

5 Claims, 11 Drawing Sheets

(51) Int. Cl.
*H04M 3/42* (2006.01)
*G06F 15/16* (2006.01)
*H04M 3/22* (2006.01)
*H04L 29/06* (2006.01)
*H04W 12/12* (2009.01)

(56) References Cited

U.S. PATENT DOCUMENTS

| | | | |
|---|---|---|---|
| 7,039,431 B2 * | 5/2006 | Mukherjee | 455/461 |
| 7,174,163 B2 * | 2/2007 | Aksu et al. | 455/414.1 |
| 7,898,990 B2 * | 3/2011 | Kallio et al. | 370/261 |
| 2006/0227960 A1 | 10/2006 | Hanson | |
| 2007/0066288 A1 | 3/2007 | Soelberg et al. | |
| 2007/0077912 A1 | 4/2007 | Mahajan | |
| 2007/0275718 A1 | 11/2007 | Descombes | |

FOREIGN PATENT DOCUMENTS

| CN | 101198121 A | 6/2008 |
|---|---|---|
| JP | 2005 159435 A | 6/2005 |
| WO | WO 96 20572 A | 7/1996 |
| WO | WO 2004 107722 A | 12/2004 |

OTHER PUBLICATIONS

3GPP TS 24.008 V8.3.0; 3rd Generation Partnership Project; Technical Specification Group Core Network and Terminals; Mobile radio interface Layer 3 specification; Core network protocols; Stage 3 (Release 8); Sep. 2008.

3GPP TS 29.002 V8.7.0; 3rd Generation Partnership Project; Technical Specification Group Core Network and Terminals; Mobile Application Part (MAP)specification; (Release 8); Sep. 2008.

ITU-T Q.931, Telecommunication Standardization Sector of ITU, Series Q: Switching and Signalling, Digital Subscriber Signalling System No. 1-Network layer, ISDN user-network interface layer 3 specification for basic call control, May 1998.

ITU-T Q.763, Telecommunication Standardization Sector of ITU, Series Q: Switching and Signalling, Specifications of Signalling System No. 7-ISDN user part, Signalling System No. 7-ISDN user part formats and codes, Dec. 1999.

* cited by examiner

METHOD AND APPARATUS FOR ACQUIRING AN IMEI ASSOCIATED TO AN IMSI

TECHNICAL FIELD

The invention relates to a method and node in a telecommunications system, and in particular to a method and node for providing the identity of a first user equipment to a second user equipment in the telecommunication system.

BACKGROUND

Increasing security risks have led to a demand for telephone calls to be monitored. One form of monitoring is the lawful interception by a law enforcement agency of telephone calls made to or from a target. A law enforcement agency is defined as a body that is authorised by law to carry out telecommunication interceptions, i.e. a particular communication involving a particular target.

To perform a lawful interception a law enforcement agency may monitor any one of a number of different identities that might be assigned to a target, for example the international mobile equipment identity (IMEI) of a target, international mobile subscriber identity (IMSI) and/or mobile station international ISDN number (MSISDN).

The IMEI, for example, is defined in the 3GPP standard TS 23.003. As can be seen from FIG. 1, the structure of the IMEI includes a Type Allocation Code (TAC) comprising 8 bits, a Serial Number (SNR) comprising 6 bits and a spare digit. A law enforcement agency may therefore, under lawful instruction, monitor a communication network for communication that is established through a particular user equipment device, i.e. using the serial number of that target device which is contained within the IMEI.

When a particular target device having a particular IMEI is earmarked as being suspect (for example because it is being used by a suspect person or organisation), then a lawful intercept may be ordered for that IMEI. The technical requirements for performing a lawful intercept are defined in 3GPP standards TS 42.033 and TS 43.033, plus the ETSI standard TS 101 671 relating to the handover interface for the lawful interception of telecommunications traffic.

A problem with performing this type of lawful interception on a particular target device is that the IMEI (or similar identity) of the target device must be known in the first place, so that the IMEI can be monitored prior to performing the lawful interception.

SUMMARY

It is an object of the present invention to provide a method and node for providing the identity of a first user equipment to a second user equipment in a telecommunications system.

According to a first aspect of the invention, there is provided a method in a node of a telecommunication system. The method comprises the steps of: receiving a call establishment request between a first user equipment and a second user equipment; acquiring the identity of the second user equipment; and providing the identity of the second user equipment to the first user equipment.

Prior to the acquiring step and/or the providing step, the method may further comprise the step of determining whether the first user equipment is subscribed to a service that allows the first user equipment to know the identity of the second user equipment.

The step of acquiring the identity and/or the step of providing the identity may be performed either automatically or selectively in response to the first user equipment being subscribed to the service that allows the first user equipment to know the identity of the second user equipment.

According to one embodiment, the acquiring step comprises the step of sending a request for the identity of the second user equipment from the node to a second node using an initial address message (IAM) of an ISDN user part (ISUP) protocol, and receiving the identity of the second user equipment from the second node using an answer message (ANM) or a connect message (CON) of the ISDN user part (ISUP) protocol.

According to another embodiment, the acquiring step comprises the step of receiving the identity of the second user equipment from a second node using an initial address message (IAM) of an ISDN user part (ISUP) protocol.

According to yet another embodiment, the acquiring step comprises the step of sending a request for the identity of the second user equipment from the node to a second node using an ISDN user part (ISUP) information request message, and receiving the identity of the second user equipment from the second node using an ISDN user part (ISUP) information message.

The steps of sending the ISUP information request message and receiving the ISUP information message may be performed prior to a step of performing one or more enhanced direct transfer application part (DTAP) messages and/or unstructured supplementary service data (USSD) messages between the node and the first user equipment.

The step of providing the identity of the second user equipment to the first user equipment may comprise the steps of using enhanced direct transfer application part (DTAP) protocol and/or unstructured supplementary service data (USSD) protocol.

According to another aspect of the invention, there is provided a node in a telecommunication system. The node comprises: means adapted to receive a call establishment request between a first user equipment and a second user equipment; means adapted to acquire the identity of the second user equipment; and means adapted to provide the identity of the second user equipment to the first user equipment.

According to one embodiment, the node further comprises means adapted to determine whether the first user equipment is subscribed to a service that allows the first user equipment to know the identity of the second user equipment.

The means adapted to acquire the identity may be configured to use one or more ISDN user part (ISUP) messages sent between the node and a second node associated with the second user equipment.

According to one embodiment, at least one of the ISDN user part (ISUP) messages comprises an initial address message (IAM), an answer message (ANM), a connect message (CON), an information request message or an information message.

The means adapted to provide the identity of the second user equipment to the first user equipment may be configured to use enhanced direct transfer application part (DTAP) protocol and/or unstructured supplementary service data (USSD) protocol.

The means adapted to acquire the identity and/or the means adapted to provide the identity may be operable either automatically or selectively in response to a specific request made by the first user equipment to know the identity of the second user equipment.

The invention has the advantage of enabling a first user equipment, for example that of a law agent from a law enforcement agency, to receive the identity of a connected party, for example a second user equipment being used by a suspect target.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The present invention is concerned with a telecommunications system and method that enables a first user equipment, for example user equipment used by a law enforcement agency, to receive or learn the identity (such as the IMEI) of a second user equipment, for example a phone that has been used in suspect calls (for example, calls to or from suspect persons). Knowing the identity (IMEI) of user equipment of particular calls may, in some cases, be of particular interest to law agents. By definition, the IMEI is associated with a particular user equipment. When for a particular user equipment the SIM is swapped, calls made to or from that user equipment still show the same IMEI, despite the SIM being swapped. In other words, the same IMEI will be placed in the call detail record (CDR) of the serving mobile switching centre (MSC).

The invention provides a mechanism that enables a law enforcement agency, by simple means, to acquire or know the IMEI of the remote party (calling party or called party). The invention has numerous applications. For example a law enforcement agency may notice, for example, that two suspect calls, possibly established to or from different persons (subscribers) exhibit the same IMEI. This would indicate that these calls are made from the same user equipment; hence, the respective callers/callees are somehow related to one another.

The description below will be made in relation to acquiring or obtaining the international mobile equipment identity (IMEI) of a user equipment (for example a target) and providing the IMEI to another user equipment (for example a law agent). However, it will be appreciated that the invention is equally applicable to determining other forms of information that can be used to identify a specific piece of user equipment, including but not limited to the international mobile subscriber identity (IMSI).

Furthermore, although the description below is made in relation to determining the IMEI of a calling/called party in order to perform a lawful intercept, it will be appreciated that the identity or IMEI of a calling/called party can be used for any purpose or application, including but not limited to keeping track of particular devices. For example, the invention can be used to provide input to regular lawful investigation work.

Figure 1:
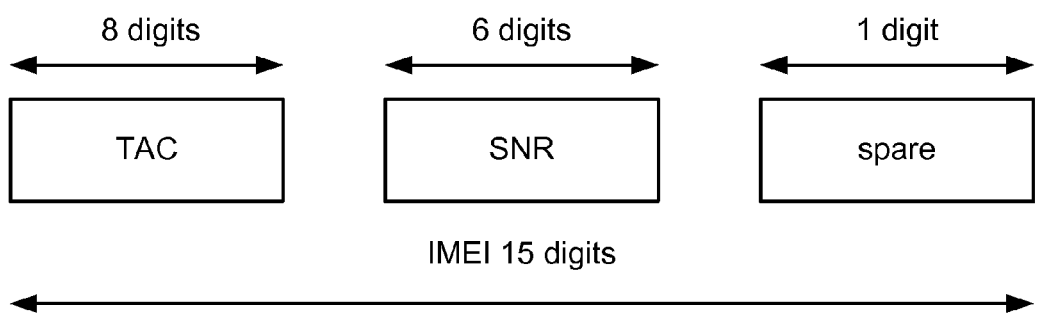
FIG. 1 shows the structure of an international mobile equipment identity (IMEI) according to the 3GPP standard TS 23.003.
Figure 2:
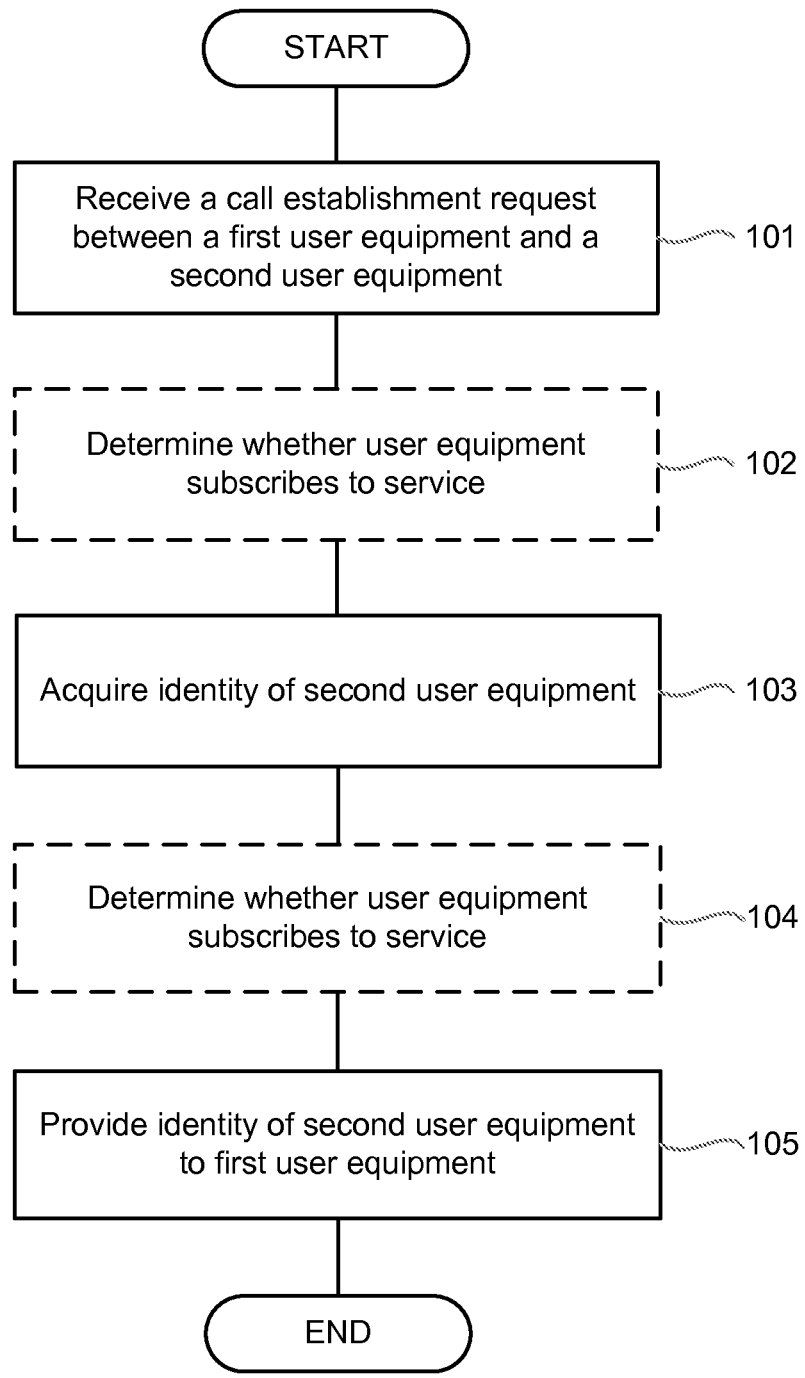
FIG. 2 shows a flow chart illustrating the steps performed by a first aspect of the present invention.

In its broadest aspect the invention relates to acquiring the identity of a user equipment when a call is established between the user equipment and another user equipment, and providing the identity of the user equipment to the other user equipment. Referring to FIG. 2, this aspect of the invention comprises the step of receiving a call establishment request between a first user equipment and a second user equipment, step 101, acquiring the identity of the second user equipment, step 103, and providing the identity of the second user equipment to the first user equipment, step 105. Prior to the step of acquiring the identity of the second user equipment (i.e. step 103) and/or the step of providing the identity of the second user equipment to the first user equipment (i.e. step 105), the invention may also comprise the step of determining whether the first user equipment is subscribed to a service that allows the first user equipment to acquire or receive the identity of the second user equipment, as shown by steps 102 and 104. The embodiments below describe examples of how the identity of the user equipment can be acquired, and how the identity can be provided to the other user equipment. The embodiments also describe examples of how this may be achieved when making a call to a target user equipment, or receiving a call from a target user equipment.

Figure 3:
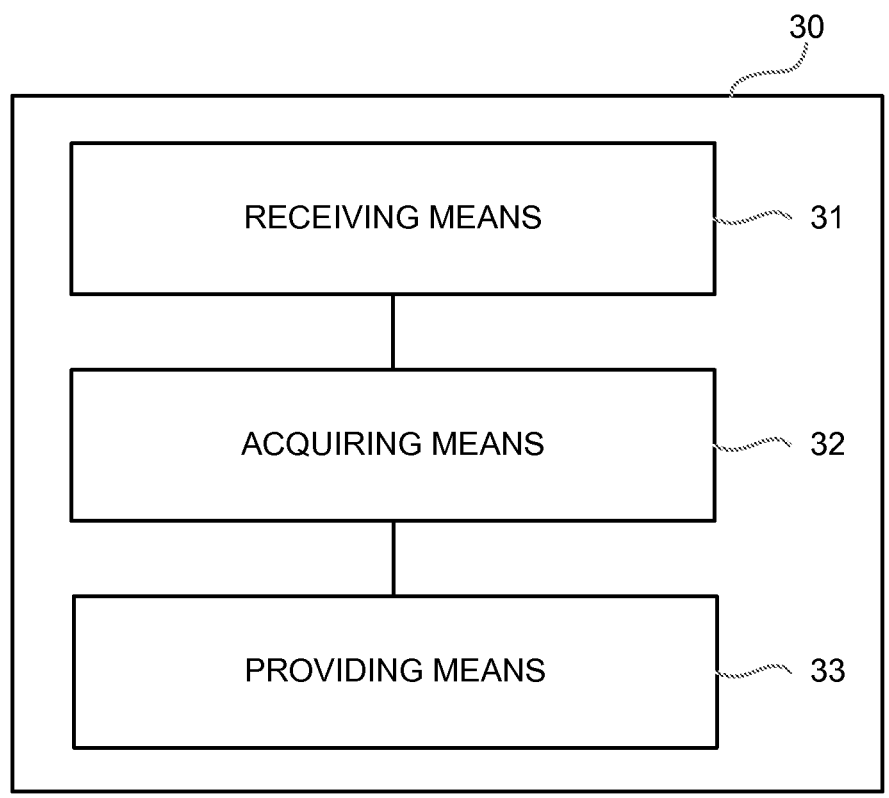
FIG. 3 shows a node according to one aspect of the invention.

FIG. 3 shows a node 30, for example a mobile switching centre (MSC) in a telecommunications network, according to one aspect of the present invention. The node 30 comprises receiving means 31 for receiving a call establishment request between a first user equipment and a second user equipment. The receiving means may comprise an interface, for example an interface for communicating with another mobile switching centre (MSC) and/or a mobile station (e.g. user equipment), The node 30 further comprises acquiring means 32 for acquiring the identity of a user equipment. The acquiring means 32 may comprise a processor that is adapted to obtain the identity of a user equipment, for example by controlling the receiving means or retrieving the identity information from an internal memory (not shown) within the node 30. The node 30 further comprises providing means 33 for providing the identity of a user equipment to another user equipment.

Figure 4:
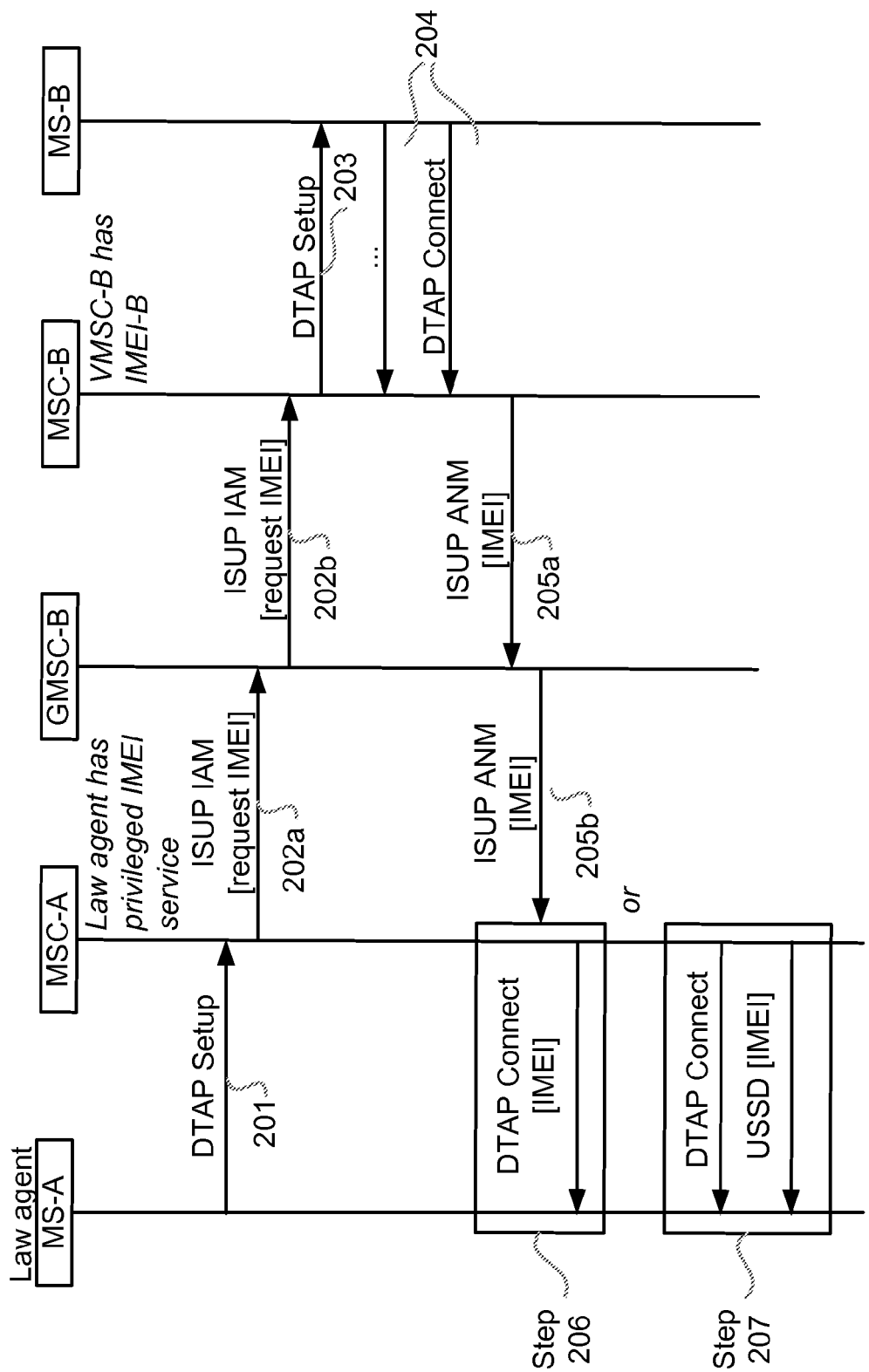
FIG. 4 shows the steps performed according to one embodiment of the invention, when making a call from a first user equipment to a second user equipment.

FIG. 4 shows the steps performed according to one embodiment of the invention, for enabling a first user equipment MS-A to acquire the identity of a second user equipment MS-B. It is noted that not all of the steps shown in FIG. 4 are essential to the invention, and that other steps (not shown) may also be performed during the procedure without departing from the scope of the invention.

Referring to FIG. 4, in step 201a first user equipment MS-A (for example that of a law agent) begins the process of establishing a call with a second user equipment MS-B, by communicating with a first mobile switching centre MSC-A serving the first user equipment MS-A. Step 201 may comprise the direct transfer application part (DTAP) setup procedure. If the first mobile switching center MSC-A serving the first user equipment MS-A determines that the first user equipment MS-A requires the identity of the second user equipment MS-B, the first mobile switching center MSC-A serving the first user equipment MS-A takes steps to acquire the identity of the second user equipment MS-B.

In one embodiment, the first mobile switching centre MSC-A determines that the first user equipment MS-A requires the identity of the second user equipment MS-B based on the fact that the first user equipment MS-A is subscribed to a predetermined service (i.e. a service which allows the identity of the second user equipment MS-B to be provided or made known to the first user equipment MS-A). The subscription to the predetermined service acknowledges that the first user equipment MS-A is entitled or authorised to receive the identity of the second user equipment. In other words, the first user equipment MS-A has a form of "privileged" subscription. The subscription to this privileged service may form part of the subscribed services in the home location register (HLR) of the first user equipment MS-A, and may be conveyed from the HLR to the MSC-A of the first user equipment. For example, the subscription to this privileged service may be conveyed to the MSC-A of the first user equipment using one of the available code values, i.e. spare values, of the SS-Code values in MAP (as defined in standard 3GPP TS 29.002).

If the first mobile switching centre MSC-A determines that the first user equipment MS-A is subscribed to this service, the first mobile switching centre MSC-A can take steps to acquire the IMEI of the second user equipment MS-B. For example, in steps 202a and 202b the first mobile switching centre MSC-A communicates with a second mobile switching centre MSC-B serving the second user equipment MS-B. In FIG. 4 this is shown as being made through an intermediate, or gateway mobile switching centre GMSC-B. It will be appreciated that the presence of an intermediate, or gateway mobile switching centre GMSC-B is only optional, and may be omitted without departing from the scope of the present invention.

The IMEI of the second user equipment MS-B may be requested, for example, using ISDN user part (ISUP) messages sent between the first mobile switching centre MSC-A and the second mobile switching centre MSC-B when establishing a call between the first user equipment MS-A and the second user equipment MS-B. For example, one or more bits in a designated parameter in the ISUP initial address message (IAM) can be used to indicate that the IMEI of the connected user equipment MS-B is being sought. The request may be conveyed, for example, in one of the spare bits in the "optional call forward indicators" parameter in the ISUP IAM (as defined under ITU-T Q.763, section 3.38).

The second mobile switching centre MSC-B serving the second user equipment MS-B can acquire the IMEI of the second user equipment MS-B during the DTAP setup procedure shown in steps 203 and 204. Alternatively, the second mobile switching centre MSC-B may have the IMEI of the second user equipment MS-B already available, for example stored in its memory as set out by standard 3GPP TS 24.008, "Authentication and ciphering request" procedure. In other words, the second mobile switching centre MSC-B may have previously acquired the IMEI of the second user equipment MS-B during previous DTAP procedures, and kept the IMEI in its internal memory for use with designated MAP messages, such as "any time interrogation" (ATI) result and Update Location (UL), as defined by 3GPP TS 29.002.

When the second mobile switching centre MSC-B serving the second user equipment MS-B receives a request for the IMEI of the second user equipment MS-B, for example in the ISUP IAM message as described above, the second mobile switching centre MSC-B can include the IMEI of the second user equipment MS-B in the ISUP Connect message (CON) or ISUP Answer message (ANM) sent from the second mobile switching centre MSC-B to the first mobile switching centre MSC-A in steps 205a and 205b. As noted above, although the ISUP messages are shown passing through an intermediate or gateway mobile switching centre GMSC-B, this is merely optional, and the invention is also applicable where the messages are passed directly between MSC-A and MSC-B, or vice versa. When using the ISUP CON or ANM message to convey the IMEI, the Generic Number parameter can be used for conveying the IMEI, for example using one of the spare Number qualifier indicator values, as defined in ITU-T Q.763, section 3.26.

Reporting the IMEI of the second user equipment MS-B from the first mobile switching centre MSC-A to the first user equipment MS-A can be done using suitable signaling messages, for example through enhanced DTAP signaling and a suitably adapted first user equipment MS-A, as shown in step 206 (further details of the DTAP signaling being found in standard 3GPP TS 24.008, section 9.3.5). A designated parameter can be added to the Connect message (CON); said parameter containing the identity information, i.e. IMEI.

Alternatively, the transfer of the IMEI of the second user equipment MS-B from the first mobile switching centre MSC-A to the first user equipment MS-A can be carried out using USSD applications in the first mobile switching centre MSC-A, as shown in step 207. For example, the first mobile switching centre MSC-A can invoke a resident USSD application, which uses standard USSD signaling to transfer the IMEI of the second user equipment MS-B (in a USSD message) to the first user equipment MS-A.

Upon receipt of the IMEI of the second user equipment MS-B, the first user equipment MS-A can be adapted to place the IMEI of the second user equipment MS-B in the call log, for example, and optionally display the IMEI of the second user equipment MS-B together with one or more other parameters such as the connected line identity, time or date, if available.

It can be seen from the embodiment of FIG. 4 that the first user equipment MS-A is automatically provided with the IMEI of the second user equipment MS-B based on the first user equipment MS-A being subscribed to the service. In other words, the first user equipment MS-A making the originating call (i.e. the law agent) has a subscription for identifying the second user equipment, implying that for every call that is established by the first user equipment MS-A, the first mobile switching centre MSC-A serving the first user equipment MS-A will acquire the identity of the second user equipment MS-B by including in the ISUP IAM a request for IMEI from the second user equipment MS-B.

According to another embodiment, the subscription by the first user equipment MS-A may have a "default request qualifier". The default request qualifier is an additional parameter associated with the subscription. The default request qualifier has the following functions:

1: default request qualifier=TRUE. When the default request qualifier is set as "true", this implies that the default action by the first mobile switching centre MSC-A, when establishing an outgoing call from the first user equipment MS-A to the second user equipment MS-B, is to include the request for the IMEI of the second user equipment MS-B in the ISUP IAM. In other words, when the default request qualifier is set to "true", the MSC-A will automatically request the identity of the connected user equipment. However, the first user equipment MS-A may, when sending the call establishment request message to the first mobile switching centre MSC-A, indicate to the MSC-A that for this particular call, the first user equipment MS-A does not wish to receive the identity of the second user equipment MS-B. In other words, a specific request can be made by the first user equipment MS-A to override the default setting.

2: default request qualifier=FALSE. When the default request qualifier is set as "false", this implies that the default action by the first mobile switching centre MSC-A, when establishing an outgoing call from the first user equipment MS-A to the second user equipment MS-B, is not to include the request for IMEI of the second user equipment MS-B in the ISUP IAM. In other words, when the default request qualifier is set to "false", the MSC-A will automatically omit to include a request for the IMEI of the connected user equipment. However, the first user equipment MS-A may, when sending the call establishment request message to the first mobile switching centre MSC-A, indicate to the MSC-A that for this particular call, the first user equipment MS-A wishes to receive the IMEI of the second user equipment MS-B. In other words, a specific request can be made by the first user equipment MS-A to override the default setting.

Figure 5A:
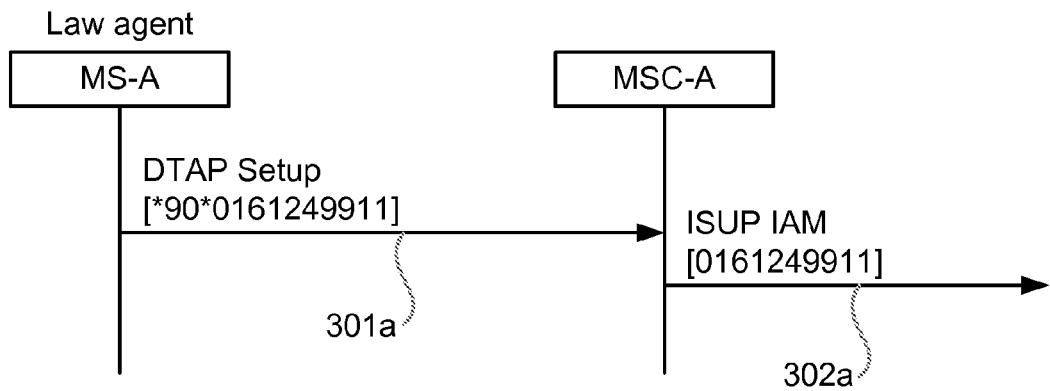
FIG. 5a shows the steps performed according to another embodiment when making a call from a first user equipment to a second user equipment.
Figure 5B:
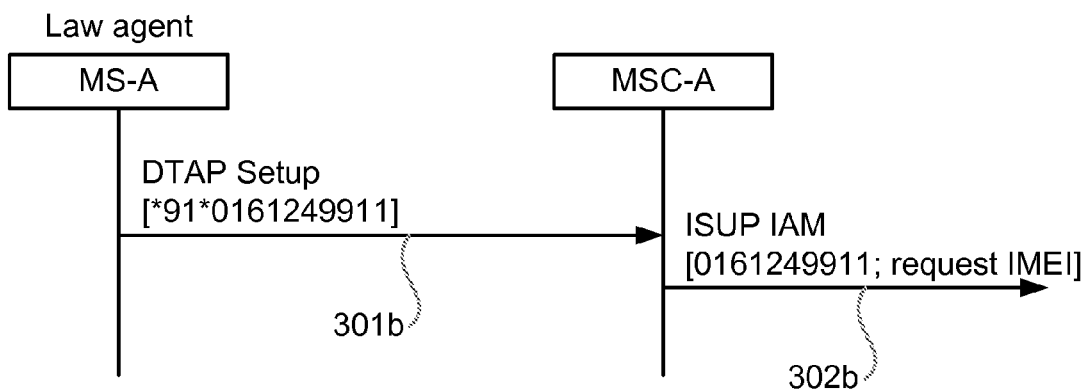
FIG. 5b shows the steps performed according to another embodiment when making a call from a first user equipment to a second user equipment.

FIGS. 5a and 5b show partial signaling sequences depicting the usage of the codes, for example "*90*" and "*91*", for making a per-call indication by the first user equipment MS-A, included in the call establishment request message sent to the first mobile switching centre MSC-A.

Referring to FIG. 5a, if a first code, for example "*90*", is placed before a telephone number 0161249911 (i.e. resulting in *90*0161249911 as shown in step 301a), this indicates that the identity of the second user equipment MS-B is not being requested for this particular call. The MSC-A according to this embodiment is configured to remove the first code "*90*" from the dialed digit string and to suppress the IMEI request in the outgoing ISUP IAM, as shown in step 302a.

Referring to FIG. 5b, if a second code, for example "*91*", is placed before a telephone number 0161249911 (i.e. resulting in *91*0161249911 as shown in step 301b), this indicates that the identity of the second user equipment MS-B is being requested for this particular call. The MSC-A according to this embodiment is configured to remove the second code "*91*" from the dialed digit string and to include the IMEI request in the outgoing ISUP IAM, as shown in step 302b. Subsequent stages for acquiring and providing the IMEI can follow the steps described above in FIG. 4.

Codes such as "*90*" or "*91*" are included in the dialed digit string sent by the first user equipment MS-A to the first mobile switching centre MSC-A, which is standard behaviour for GSM terminals.

From the above it can be seen that, even when the first user equipment MS-A is subscribed to such a service, the first user equipment MS-A may still chose to opt out of receiving the service (i.e. the identity of the second user equipment MS-B), either on a default basis or on a per-call basis. As such, the step of acquiring the identity and/or the step of providing the identity is performed either automatically or selectively in response to the first user equipment being subscribed to the service that allows the first user equipment to know the identity of the second user equipment.

It will be appreciated from FIG. 4 that, in the first mobile switching centre MSC-A, the "acquiring step" in the flow chart of FIG. 2 comprises the step of sending a request for the identity of the second user equipment MS-B from the first mobile switching centre MSC-A to the second mobile switching centre MSC-B using an initial address message (IAM) of the ISDN user part (ISUP) protocol (i.e. step 202a), and receiving the identity of the second user equipment MS-B from the second mobile switching centre MSC-B using an answer message (ANM) or a connect message (CON) of the ISDN user part (ISUP) protocol, step 205b. In FIG. 4, the "providing step" of FIG. 2 comprises the step of using DTAP signalling to send the identity of the second user equipment MS-B from the first mobile switching centre MSC-A to the first user equipment MS-A (i.e. step 206), and/or using USSD signalling (i.e. step 207).

It will also be appreciated from FIG. 4 that, in the second mobile switching centre MSC-B, the "acquiring step" in the flow chart of FIG. 2 comprises the step of retrieving the identity of the second user equipment MS-B either from the memory of the second mobile switching centre MSC-B (e.g. when the IMEI has been previously obtained) or on the fly from the second user equipment MS-B using DTAP signalling (steps 203, 204). In FIG. 4, the "providing step" of FIG. 2 comprises the step of sending the IMEI in the ISUP ANM or ISUP CON message from the second mobile switching centre MSC-B to the first mobile switching centre MSC-A.

It can be seen that FIGS. 4, 5a and 5b deal with the situation where the identity of a target user equipment (i.e. the second user equipment MS-B) is provided to the law agent (i.e. the first user equipment) when a call is being established from the law agent to the target user equipment. The invention can also be applied to the situation when a call is made, from the target user equipment to the law agent. As such, when a call is established from the second user equipment MS-B to the first user equipment MS-A, the identity of the second user equipment MS-B is also acquired, and provided to the first user equipment MS-A.

The IMEI of the second user equipment MS-B can be acquired and provided to the first user equipment MS-A in response to the first user equipment MS-A being subscribed to a predetermined service (i.e. a "privileged" subscription that enables the first user equipment MS-A to know or receive the identity of the second user equipment MS-B). The subscription to this privileged service may form part of the subscribed services in the home location register (HLR) of the first user equipment MS-A, and may be conveyed from HLR to the first mobile switching centre MSC-A serving the first user equipment MS-A using one of the spare or available SS-Code values in MAP (the code values being defined in 3GPP standard TS 29.002).

According to one embodiment, providing the identity of the second user equipment MS-B (i.e. the calling party) to the first user equipment MS-A (i.e. the called party) having the aforementioned privileged subscription can be made on an unconditional basis, for example by inclusion in the ISUP IAM. According to another embodiment, providing the identity of the second user equipment MS-B to the first user equipment MS-A having the aforementioned privileged subscription can be made through an ISUP information request.

Further details of the first of the above mentioned embodiments will now be made with reference to FIG. 6. When a call is established within one of the PLMNs in the country to which the first user equipment MS-A (e.g. law agent) belongs, the second mobile switching centre MSC-B serving the second user equipment MS-B includes the IMEI of the second user equipment MS-B in the ISDN user part (ISUP)

initial address message (IAM) sent between the second mobile switching centre MSC-B and the first mobile switching centre MSC-A when establishing a call from the second user equipment MS-B to the first user equipment MS-A, steps 401, 402, 403. For example, a spare value of the Number qualifier indicator in the Generic Number parameter of the ISUP IAM message can be used.

At the first mobile switching centre MSC-A, if it is determined that the ISUP IAM arrives for a user equipment having a subscription to said privileged service (i.e. service to receive the IMEI of the calling party), the first mobile switching centre MSC-A serving the first user equipment MS-A acquires the IMEI and provides the IMEI of the second user equipment MS-B to the called first user equipment MS-A, for example when offering the call to that party.

Reporting the IMEI of the second user equipment MS-B to the first user equipment MS-A can be done through enhancements to the DTAP signaling procedures and an adapted first user equipment MS-A, as shown in step 404. For example, DTAP signaling procedures defined in 3GPP standard TS 24.008, section 9.3.23 may be used. A designated parameter can be added to the Setup message, said parameter containing the IMEI of the second user equipment MS-B.

Alternatively, the transfer of the IMEI of the second user equipment MS-B to the first user equipment MS-A can be done using a USSD application in the first mobile switching centre MSC-A. The first mobile switching centre MSC-A serving the first user equipment MS-A can invoke a resident USSD application, which uses standard USSD signaling to transfer the IMEI in a USSD message to the first user equipment MS-A, as shown in steps 405.

The first user equipment MS-A can place the IMEI of the second user equipment MS-B in the call log. According to one embodiment, the first user equipment MS-A is adapted to display the IMEI of the second user equipment MS-B to the first user equipment MS-A together with other information, such as the calling line identity, time or date, if available. In other words, the user equipment device comprises display means that is adapted to display the identity of a connected user equipment.

Figure 6:
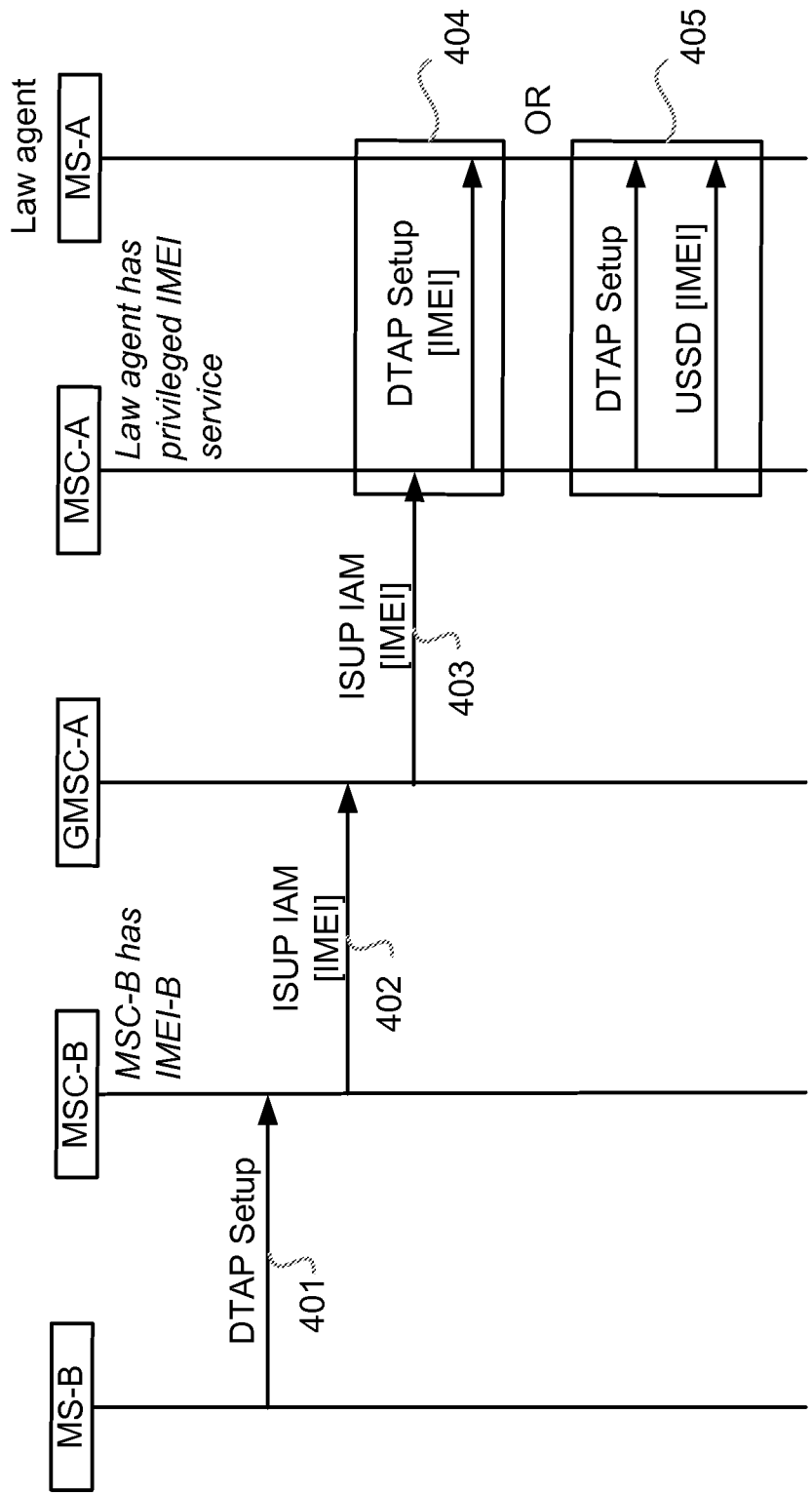
FIG. 6 shows the steps performed according to another embodiment when a first user equipment receives a call from a second user equipment.

It can be seen from the embodiment of FIG. 6 above that the identity of the second user equipment MS-B is automatically (or unconditionally) provided to the first user equipment MS-A when a call is established from the second user equipment MS-B to the first user equipment MS-A. The IMEI can be automatically provided to the first user equipment MS-A as a result of the first user equipment MS-A being subscribed to the service.

As mentioned earlier, according to another embodiment, providing the identity of the second user equipment MS-B to the first user equipment MS-A having the aforementioned privileged subscription can be made through an ISUP information request.

Figure 7:
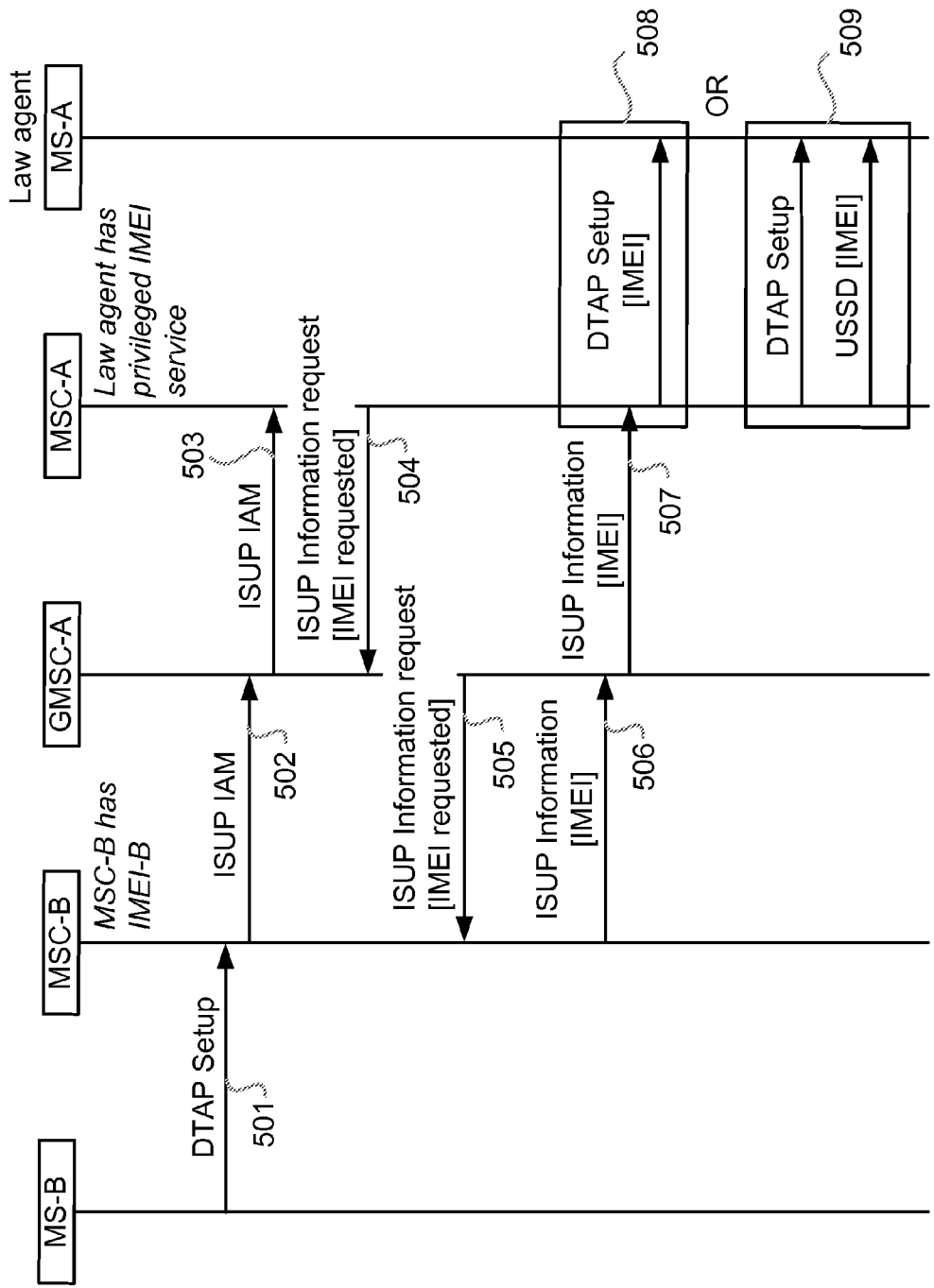
FIG. 7 shows the steps performed according to another embodiment when a first user equipment receives a call from a second user equipment.

FIG. 7 describes such an embodiment. When the first mobile switching centre MSC-A serving the first user equipment MS-A (i.e. law agent or called party) receives an ISUP IAM via steps 502 and 503, the first mobile switching centre MSC-A may request the second mobile switching centre MSC-B serving the calling party (i.e. serving the second user equipment MS-B), to provide the IMEI of the second user equipment MS-B.

For example, in steps 504 and 505 the ISUP message "Information request" may be used. The Information request message, containing the "information request indicators" parameter may be sent from the first mobile switching centre MSC-A of the first user equipment MS-A towards the second mobile switching centre MSC-B serving the second user equipment MS-B. One of the spare or reserved bits, for example, in that parameter may be used to signal that the IMEI is being requested.

The second mobile switching centre MSC-B associated with the second user equipment MS-B will, in response, send the ISUP information message in steps 506, 507. The ISUP information message will contain the requested IMEI of the second user equipment MS-B. The first mobile switching centre MSC-A can then provide the IMEI of the calling party towards the first user equipment MS-A through DTAP signaling (as shown in step 508) or through USSD signaling (as shown in step 509), as described in further detail in FIG. 6 above.

It can be seen from the embodiment of FIG. 7 that the first mobile switching centre MSC-A serving the first user equipment MS-A requests the IMEI from the second mobile switching centre MSC-B of the calling party (i.e. the second user equipment MS-B), prior to sending DTAP Setup messages to the first user equipment MS-A.

Figure 8:
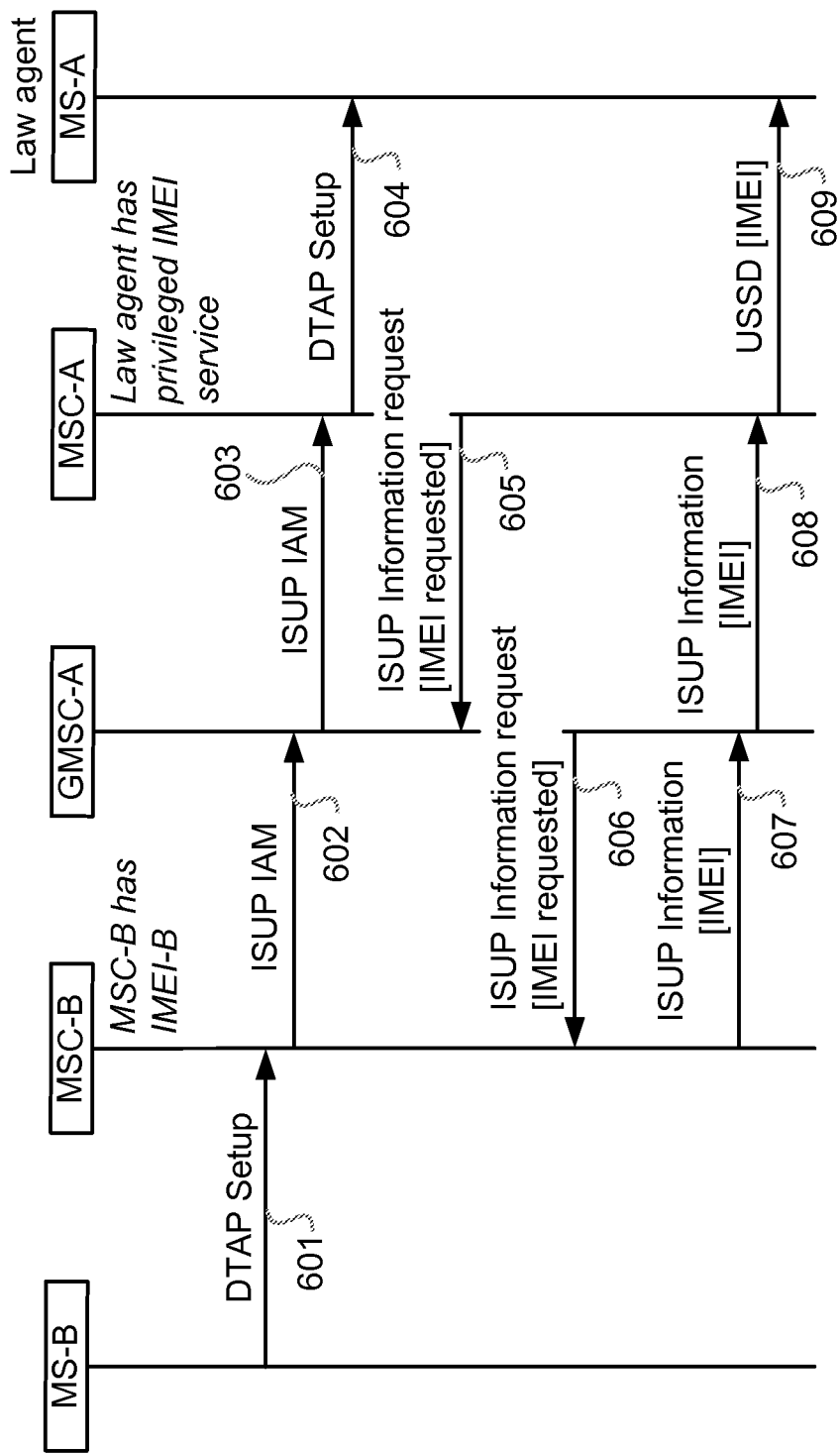
FIG. 8 shows the steps performed according to another embodiment when a first user equipment receives a call from a second user equipment.

FIG. 8 shows an alternative embodiment, whereby the first mobile switching centre MSC-A offers the call to first user equipment MS-A without delay, as shown in step 604. Thereafter, whilst call alerting is ongoing, the first mobile switching centre MSC-A uses ISUP messages "Information request" (steps 605, 606) and "Information" (steps 607, 608) to acquire the IMEI of the calling party from the second mobile switching centre MSC-B. When the IMEI is received, the first mobile switching centre MSC-A provides the IMEI towards the first user equipment MS-A by means of USSD signaling, step 609. The embodiment of FIG. 8 has the advantage of not incurring any delay in the normal call set up procedure.

It will therefore be appreciated that the embodiments of FIGS. 7 and 8 provide IMEI reporting upon request (i.e. through ISUP Information request), compared to the unconditional reporting of IMEI in FIG. 6 (i.e. using unconditional inclusion of IMEI in ISUP IAM). The embodiments of FIGS. 7 and 8 have the advantage that the IMEI will be conveyed through the network only when required, i.e. only when the called subscriber has a subscription to the IMEI presentation service.

In the embodiments of FIGS. 7 and 8 it is assumed that the second mobile switching centre MSC-B already has the IMEI of the second user equipment MS-B stored therein. It is noted, however, that these embodiments may involve further steps between the second mobile switching centre MSC-B and the second user equipment MS-B when the IMEI is not already stored in the second mobile switching centre MSC-B.

In the embodiments of FIGS. 6, 7 and 8 the first user equipment MS-A is automatically provided with the identity of the second user equipment MS-B when the first user equipment MS-A is subscribed to the service. In other words, whenever a call is received by the first user equipment MS-A (e.g. the law agent), the first mobile switching centre MSC-A will either provide the IMEI of the calling party to the first user equipment (in the case of FIG. 6), or generate a request for IMEI towards the calling party (in the case of FIGS. 7 and 8) before providing the IMEI to the first user equipment, such that the first user equipment MS-A will always receive the identity of the calling party (i.e. the identity of the second user equipment MS-B)

According to an alternative embodiment, the subscription by the first user equipment MS-A may have a "default request qualifier". The default request qualifier is an additional parameter associated with the subscription. The default request qualifier has the following functions:

1: default request qualifier=TRUE. When the default request qualifier is set as "true", this implies that the default action by the first mobile switching centre MSC-A, when receiving an incoming call, is to send a request for IMEI towards the calling party.

2: default request qualifier=FALSE. When the default request qualifier is set as "false", this implies that the default action by the first mobile switching centre MSC-A, when receiving an incoming call, is not to send a request for IMEI towards the calling party. The first user equipment MS-A may, when having answered the call, send an indication to the first mobile switching centre MSC-A that for this particular call, the first user equipment MS-A wishes to receive the IMEI of the calling party.

From the above it can be seen that, if the default request qualifier is set as "true", the procedures shown in FIG. 7 or 8 may be followed. In other words, in this mode of operation the default action by the first mobile switching centre MSC-A, when receiving an incoming call, is to send a request for IMEI towards the calling party.

If the default request qualifier is set as "false", the default action by the first mobile switching centre MSC-A is not to send a request for IMEI towards the calling party.

Figure 9:
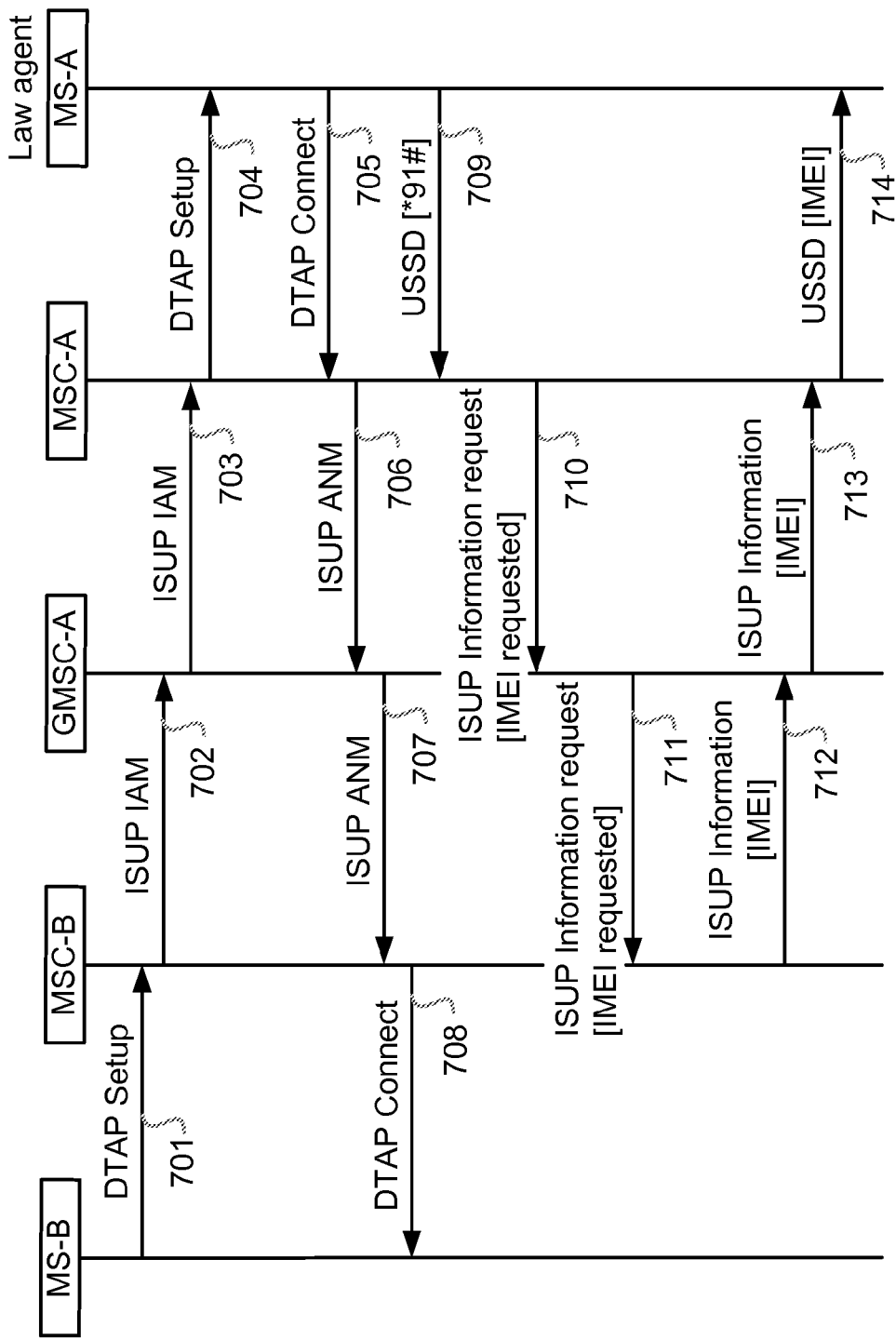
FIG. 9 shows the steps performed according to another embodiment when a first user equipment receives a call from a second user equipment.

However, referring to FIG. 9, after establishing a call (steps 701-708), a per-call request can be made by the first user equipment MS-A as shown in step 709, whereby a specific request is sent from the first user equipment MS-A to the first mobile switching centre MSC-A. The request may have the form of an unstructured supplementary service data (USSD) message. An example of a USSD message for this purpose is the use of code structures such as "*91#", which structure is in accordance with GSM TS 02.30.

The first mobile switching centre MSC-A will, in response to receiving this USSD code, request the IMEI from the calling party, steps 710, 711, 712, 713. For example, as described above the ISUP signaling mechanism can be used to acquire the IMEI of the calling party. When the first mobile switching centre MSC-A has received the IMEI from the second mobile witching centre MSC-B of the second user equipment MS-B (i.e. calling party), the first mobile switching centre MSC-A can send the IMEI to the first user equipment MS-A, for example by including the IMEI in a response message to the USSD request.

It will be appreciated that the embodiments of FIGS. 6, 7, 8 and 9 have the advantage of acquiring and providing the identity of the second user equipment to the first user equipment when a call is established from the second user equipment to the first user equipment. One very useful feature that is facilitated through the present invention is the following. When a suspect call is received from a user equipment, a law enforcement agent can easily return a call to that particular phone, even when the SIM card of that phone is swapped. As described above, the call log in the phone can be adapted to contain the IMEI, if available. When scrolling through the call log, the phone can initiate a call towards that IMEI.

To assist with the feature of calling towards an IMEI, the Called party BCD number in a DTAP Setup message from the GSM phone is adapted to contain a Numbering plan indicator (NPI) and Type of number (TON) that denotes IMEI.

The embodiments described above refer to the IMEI of the remote party being provided to the first user equipment in such a way that the IMEI can be displayed on the first user equipment. According to an alternative embodiment, the IMEI of the remote party may be provided in a detailed call log, for example provided on a remote location such as a web-based server. According to this embodiment a subscriber may access the call log via the first user equipment. Accessing the call log may be carried out using an application resident in the first user equipment, for example using an http client for accessing the call log. The subscriber having said privileged service subscription (to receive the IMEI of the remote calling or called party) may establish a call to that IMEI, by browsing through the web based call log and selecting an IMEI from said call log.

Although the embodiments described above have been made in relation to the first user equipment (i.e. that of the law agent) being a mobile terminal such as a GSM terminal, it is noted that the invention also applies to a first user equipment in the form of an ISDN terminal instead of a mobile terminal. In such embodiments the ISDN terminal may use DSS1 signaling as the access protocol (as defined in ITU-T Q.931).

The invention has the advantage that it enables a law enforcement agent (for example a police officer or investigator) to track the equipment that is used by a person for a particular call. When a suspect call is received, a law enforcement agent can easily return a call to that phone, even when the SIM card of that phone is swapped. When placing a call to a suspect number, the law enforcement officer can easily determine on which device the call is answered and then determine which other persons (MSISDNs) have been using that device.

It is noted that, although the invention has been described in relation to providing a lawful intercept based on IMEI, the invention is concerned with the aspect of providing the IMEI of a remote party to a law agent, rather than the lawful intercept per se.

Furthermore, although the embodiments above refer to using ISUP messages for obtaining the IMEI of the second user equipment, it will be appreciated that other protocols may also be used, without departing from the scope of the invention as defined in the appended claims. Similarly, other signaling protocols than DTAP and USSD may be used for passing the IMEI between the mobile switching centre and the user equipment.

The embodiments refer to the use of mobile switching centres (MSCs) for connection to the user equipment. However, it will be appreciated that other nodes or control nodes can be used for acquiring the identity information, and providing the identity information to the user equipment.

It is noted that the above embodiments may be used with any form of telecommunications network, including GSM, 3G, LTE, ISDN or PSTN communication networks. Furthermore, it is noted that the present invention may also be applied in the case where an IP multimedia system (IMS) is used as a service network and/or transmission network. When a call is established between two GSM terminals, between two ISDN terminals or between a GSM terminal and an ISDN terminal, the call may traverse an IMS network. The traversing of the IMS network may serve various purposes, including:

a calling party, while using a GSM phone, is a subscriber of an IMS network; the IMS network is used to handle voice calls (or other forms of communication sessions) established from the calling party;

a called party, while using a GSM phone, is a subscriber of an IMS network; the IMS network is used to handle voice calls (or other forms of communication sessions) established towards the called party;

an IMS network is used as a transmission network, within a network or between different networks.

IMS uses the session initiation protocol (SIP) for call establishment. According to an embodiment of the invention, the request for IMEI, as well as the IMEI itself, are, for the purpose of using IMS as a transit network, as described above, mapped to corresponding SIP messages and SIP headers or parameters. In this manner, the request for IMEI and the IMEI itself can be conveyed transparently through an IMS network, between the mobile switching centres or PSTN exchanges serving the calling and called party. The use of an IMS network, as described above, is depicted by means of an example shown in FIG. 10.

Figure 10:
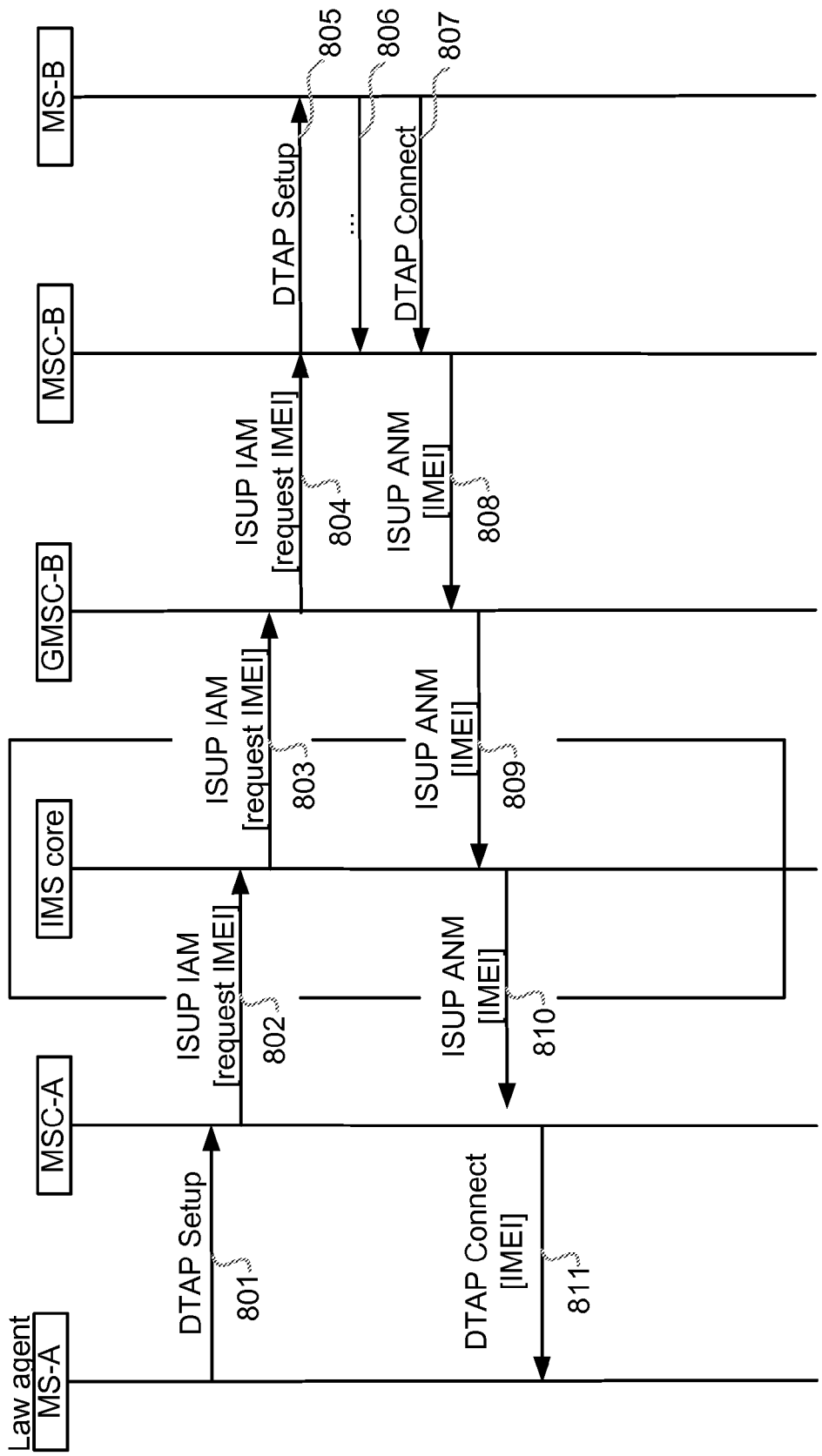
FIG. 10 shows the steps performed according to another embodiment when making a call from a first user equipment to a second user equipment through an IP multimedia system (IMS)

FIG. 10 illustrates an arrangement whereby an IMS core is provided as a transit network for a call established from a first user equipment MS-A (for example a law agent using a GSM phone), to a second user equipment MS-B (for example a destination target subscriber using a GSM phone), as shown in steps 801 to 811. The call established between the first user equipment MS-A and the second user equipment MS-B traverses the IMS network for one of the reasons given above. Furthermore, while traversing the IMS network, the IMEI request and the IMEI itself are mapped to corresponding SIP messages and SIP headers or parameters, thereby enabling the request for IMEI and the IMEI itself to be conveyed transparently through the IMS network.

Figure 11:
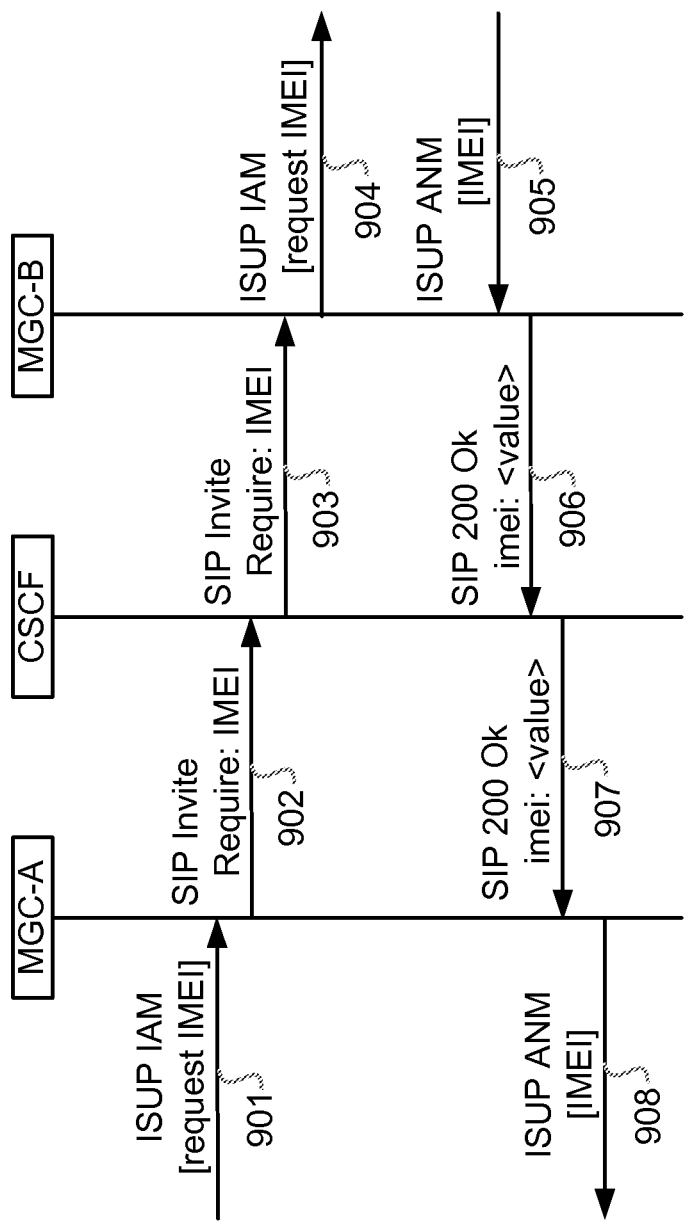
FIG. 11 shows further details of the steps performed in the IMS of FIG. 10.

FIG. 11 provides further details relating to how the request for IMEI and IMEI itself are mapped during the traversal of the IMS network. A first media gateway controller (MGC-A) constitutes a border of the IMS network, for the control plane, connecting the IMS network with a circuit switched network, such as GSM or PSTN. For example, in the example of FIG. 10, the first media gateway controller MGC-A provides a control interface between the IMS network and a first mobile switching centre MSC-A serving the first user equipment MS-A.

A call session control function (CSCF) shown in FIG. 11 represents a combination of the interrogating CSCF (I-CSCF) and serving CSCF (S-CSCF). FIG. 11 does not illustrate nodes such as home subscriber system (HSS) or breakout gateway control function (BGCF). It is, however, understood that these nodes, and other nodes, where applicable, may form part of the call establishment function in the IMS network, depending on an actual call.

FIG. 11 depicts the conversion of the "ISUP IAM" to a "SIP Invite" by the first media gateway controller MGC-A, i.e. between steps 901 and 902. In other words, the first media gateway controller MGC-A converts the "request for IMEI" parameter in the ISUP IAM into a SIP header "Require: IMEI". When the signaling traverses the IMS to GSM boundary, a second media gateway controller MGC-B converts the SIP Invite "Require: IMEI" back to a ISUP IAM parameter "request for IMEI", i.e. between steps 903 and 904.

Likewise, the ISUP ANM sent from the called party (i.e. second user equipment MS-B) towards the calling party (i.e. first user equipment MS-A) traverses the IMS network. The IMEI parameter in the ISUP ANM is converted, by the second media gateway controller MGC-B, into a SIP header "IMEI: <value>", whereby <value> represents the actual IMEI. The "IMEI: <value>" is placed into a "SIP 200 Ok" message, as shown between steps 905 and 906. When the signaling traverses the IMS to GSM boundary, the first media gateway controller MGC-A converts the SIP 200 Ok message into an ISUP ANM message. The "IMEI: <value>" from the SIP 200 Ok message is converted to the IMEI in ISUP ANM.

As can be seen from FIGS. 10 and 11 above, the request for IMEI and the IMEI itself can be conveyed transparently through an IMS network, between a calling and called party's serving MSC or Local exchange.

Although FIGS. 10 and 11 are described in relation to one arrangement whereby a call is made from a law agent to a target terminal, it will be appreciated that an IMS can be used with any of the above mentioned embodiments.

It is noted that a user equipment may comprise any form of user equipment, including but not limited to mobile terminals, ISDN terminals or other terminals.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a node of a telecommunication system, the method comprising the steps of:
   receiving a call establishment request between a first mobile user equipment and a second mobile user equipment, where the second user equipment's international mobile equipment identity (IMEI) or international mobile subscriber identity (IMSI) is not known:
   determining that the first user equipment is subscribed to a service that allows the first user equipment to know the IMEI or the IMSI of the second user equipment;
   acquiring the IMEI or the IMSI of the second user equipment, including the step of sending a request for the IMEI or the IMSI of the second user equipment from the node to a second node using an initial address message (IAM) of an ISDN user part (ISUP) protocol, and receiving the IMEI or the IMSI of the second user equipment from the second node using an answer message (ANM) or a connect message (CON) of the ISDN user part (ISUP) protocol; and
   providing the IMEI or the IMSI of the second user equipment to the first user equipment, wherein the step of acquiring the identity or the step of providing the identity is performed either automatically or selectively in response to the first user equipment being subscribed to the service that allows the first user equipment to know the identity of the second user equipment.

2. The method as claimed in claim 1, wherein the acquiring step comprises the step of sending a request for the IMEI or the IMSI of the second user equipment from the node to a second node using an ISDN user part (ISUP) information request message, and receiving the identity of the second user equipment from the second node using an ISDN user part (ISUP) information message.

3. The method as claimed in claim 2, wherein the steps of sending the ISUP information request message and receiving the ISUP information message are performed prior to a step of performing one or more enhanced direct transfer application part (DTAP) messages or unstructured supplementary service data (USSD) messages between the node and the first user equipment.

4. A node in a telecommunication system, the node comprising:
   means adapted to receive a call establishment request between a first mobile user equipment and a second user equipment, where the second mobile user equipment's international mobile equipment identity (IMEI) or international mobile subscriber identity (IMSI) is not known;
   means adapted to determine that the first user equipment is subscribed to a service that allows the first user equipment to know the IMEI or the IMSI of the second user equipment;
   means adapted to acquire the IMEI or the IMSI of the second user equipment, the means adapted to acquire the identity is configured to use one or more ISDN user part (ISUP) messages sent between the node and a second node associated with the second user equipment; and means adapted to provide the IMEI or the IMSI of the second user equipment to the first user equipment, wherein the means adapted to acquire the identity or the means adapted to provide the identity is operable either automatically or selectively in response to a specific request made by the first user equipment to know the identity of the second user equipment.

5. The method as claimed in claim 1, wherein the IMEI of the second user equipment is acquired.

\* \* \* \* \*